(12) United States Patent
Skvortsov et al.

(10) Patent No.: US 10,324,960 B1
(45) Date of Patent: Jun. 18, 2019

(54) DETERMINING A NUMBER OF UNIQUE VIEWERS OF A CONTENT ITEM

(71) Applicant: Google Inc., Mountain View, CA (US)

(72) Inventors: Evgeny Skvortsov, Kitchener (CA); Lukas Rutishauser, Kirkland, WA (US); Cuizhu Shi, Bellevue, WA (US)

(73) Assignee: Google LLC, Mountain View, CA (US)

( * ) Notice: Subject to any disclaimer, the term of this patent is extended or adjusted under 35 U.S.C. 154(b) by 499 days.

(21) Appl. No.: 14/858,825

(22) Filed: Sep. 18, 2015

Related U.S. Application Data

(60) Provisional application No. 62/052,932, filed on Sep. 19, 2014.

(51) Int. Cl.
*G06F 16/00* (2019.01)
*G06F 16/28* (2019.01)
*G06F 16/955* (2019.01)
*G06F 16/954* (2019.01)

(52) U.S. Cl.
CPC .......... *G06F 16/287* (2019.01); *G06F 16/955* (2019.01); *G06F 16/954* (2019.01)

(58) Field of Classification Search
CPC ......... G06F 17/30861; G06F 17/30241; G06F 17/30598; G06F 16/95; G06F 16/954; G06F 16/955; H04L 67/22; G06Q 30/0255
See application file for complete search history.

(56) References Cited

U.S. PATENT DOCUMENTS

| | | | |
|---|---|---|---|
| 6,839,680 B1 * | 1/2005 | Liu | G06Q 30/0204 705/7.33 |
| 7,933,818 B1 * | 4/2011 | Kumar | G06Q 30/02 705/14.25 |
| 8,190,475 B1 * | 5/2012 | Merrill | G06Q 30/0251 705/14.49 |
| 8,386,599 B2 | 2/2013 | Fomitchev | |
| 9,432,253 B1 * | 8/2016 | Johansson | H04L 41/08 |
| 2003/0208594 A1 | 11/2003 | Muret | |
| 2004/0243704 A1 | 12/2004 | Botelho | |
| 2010/0228850 A1 * | 9/2010 | Fomitchev | G06Q 30/02 709/224 |
| 2014/0040463 A1 | 2/2014 | Skvortsov | |
| 2014/0081767 A1 | 3/2014 | Zhang | |
| 2014/0108130 A1 * | 4/2014 | Vos | G06Q 30/0246 705/14.45 |

* cited by examiner

*Primary Examiner* — Merilyn P Nguyen
(74) *Attorney, Agent, or Firm* — Foley & Lardner LLP (57) ABSTRACT

Methods, systems, and apparatus, including computer programs encoded on a computer storage medium, for determining a number of unique viewers of a content item. In one aspect, a method includes receiving an identifier specifying characteristics of a user associated with a device that was used to present a given content item. A user category is identified for the received identifier based on the characteristics. Each user category of a set of user categories include a respective number of pseudo-users. The received identifier is assigned to a given pseudo-user in the identified user category based on a non-linear distribution of identifiers per actual user in the identified user category. A number of unique users, including the given pseudo-user, that have viewed the given content item is determined based on a total number of pseudo-users that have been assigned an identifier corresponding to presentation of the given content item.

20 Claims, 5 Drawing Sheets

DETERMINING A NUMBER OF UNIQUE VIEWERS OF A CONTENT ITEM

CROSS-REFERENCE TO RELATED APPLICATIONS

This application claims the benefit under 35 U.S.C. § 119(e) of U.S. Patent Application No. 62/052,932, entitled "DETERMINING A NUMBER OF UNIQUE VIEWERS OF A CONTENT ITEM," filed Sep. 19, 2014. The disclosure of the foregoing application is incorporated herein by reference in its entirety for all purposes.

BACKGROUND

The Internet enables access to a wide variety of resources. For example, video, audio, webpages directed to particular subject matter, news articles, images, and other resources are accessible over the Internet. The wide variety of resources that are accessible over the Internet has enabled opportunities for content distributors to provide content items with resources that are requested by users. Content items are units of content (e.g., individual files or a set of files) that are presented at a user device. An advertisement is an example of a content item that advertisers can provide for presentation with particular resources, such as web pages and search results pages. An advertisement can be made eligible for presentation with specific resources and/or resources that are determined to match specified distribution criteria, such as distribution keywords.

SUMMARY

In general, one innovative aspect of the subject matter described in this specification can be embodied in methods that include the actions of receiving an identifier specifying characteristics of a user associated with a device that was used to present a given content item; identifying, from a set of user categories, a user category for the received identifier based on the characteristics, each user category of the set of user categories including a respective number of pseudo-users; assigning the received identifier to a given pseudo-user in the identified user category based on a non-linear distribution of identifiers per actual user in the identified user category; determining a number of unique users, including the given pseudo-user, that have viewed the given content item based on a total number of pseudo-users that have been assigned an identifier corresponding to presentation of the given content item; and generating and providing data that causes a device to present the number of unique viewers. Other embodiments of this aspect include corresponding systems, apparatus, and computer programs, configured to perform the actions of the methods, encoded on computer storage devices.

These and other embodiments can each optionally include one or more of the following features. Assigning the received identifier to the given pseudo-user can include selecting a first number from a range of numbers; determining a pseudo-user identifier based on a function of the first number, a product logarithmic function that uses the first number, and a number of actual users in the identified user category; and selecting the given pseudo-user based on the pseudo-user identifier. In some aspects, the first number is selected randomly from a uniform distribution of numbers in the range of numbers.

In some aspects, assigning the received identifier to the given pseudo-user comprises assigning the received identifier to the given pseudo-user based on a respective probability for each pseudo-user of the identified user category, the probability of each pseudo-user being determined based on the distribution of identifiers for actual users in the identifier user category. The probability for a first pseudo-user of the identified user category may be different from the probability for a second pseudo-user of the identified user category.

In some aspects, each user category includes a number of pseudo-users based on a number of actual users in a population of users that match user criteria for the user category. In some aspects, the received identifier includes a cookie.

Particular embodiments of the subject matter described in this specification can be implemented so as to realize one or more of the following advantages. A content item provider can be provided an estimate of the number of unique viewers of a content item in real time or near real time as data regarding impressions of the content item are received. Other data regarding views of the content item can also be provided in real time or near real time, such as a demographic distribution of an audience of the content item, a reach of the content item, a frequency for the content item, and/or a gross rating point for the content item. The techniques described in this document enable a data processing apparatus to obtain more accurate estimates (and/or provide estimates faster) of the number of unique viewers of content items than analyzing previously received identifiers to determine updated estimates or simply counting the number of identifiers received.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content provider may want to know the performance of a content item campaign or web resource. For example, the content provider may want to know how many people viewed a content item, how many times the content item was viewed, and which types of users viewed a given content item. A content item is a unit of content that can be presented at a user device. Examples of content items include advertisements, images, videos, documents, web pages, and applications (e.g., mobile apps). A content management system can generate and provide to a content provider a report that specifies information, such as reach, frequency, gross rating point (GRP), and/or demographic distribution of a reached audience. Reach can be defined as the number of unique users exposed to (e.g., viewed) a given content item during a given time period. Frequency refers to the average number of times that a unique user viewed a given content item over a given time period. Gross rating point is a measure that can be calculated, such as normalized reach multiplied by frequency.

The number of unique viewers exposed to a content item can be determined based on a number of identifiers received for the content item (e.g., that specifies a presentation of the content item). An identifier is data item (e.g., a cookie) associated with a user device at which a content item is presented and that uniquely identifies the user device. An identifier may be sent from a user device to the content management system in response to a presentation of a content item. The total number of identifiers received for the content item may not accurately reflect the actual number of unique viewers of the content item as multiple people may use the same device having the same identifier (e.g., same cookie) resulting in multiple unique viewers being considered a single unique viewer. Similarly, an individual may view the content item using multiple devices, each with different identifiers, resulting in an individual counting as multiple unique viewers.

The number of unique viewers of a content item can be estimated based on a known distribution of identifiers for a population of users. For example, an analysis of historical data, e.g., panel data, may indicate that the distribution of identifiers per unique viewer (e.g., per actual user) follows a particular non-linear (or linear) function. This distribution can be used to assign received identifiers to pseudo-users (e.g., online or in real time) such that a total number of pseudo-users that have been assigned an identifier follows the distribution, for example, at any given time during a given time period. The pseudo-users are non-real users that represent a population of users.

The total number of unique viewers of a content item can be estimated based on an estimated number of unique viewers for each of multiple user categories. User categories may be defined based on characteristics of the users, such as inferred interests (e.g., in fishing, camping, baseball, etc.), demographic characteristics, and/or geography (e.g., one category for a particular city and another category for a different city). The distribution of identifiers per unique viewer may differ for different user categories. A received identifier may be assigned to a pseudo-user of a user category in which the identifier belongs based on the distribution for that user category. For each user category, the number of unique viewers of a content item can be estimated based on the number of pseudo-users of the user category to which an identifier for the content item (e.g., an identifier that specifies a view of the content item) was assigned. The total number of unique viewers of the content item can then be estimated by summing the estimated number of unique viewers of the content item for each user category.

In some implementations, each identifier is assigned to a pseudo-user that belongs to a single category. In this way, the total number of unique viewers of a content item can be determined by summing the estimated number of unique viewers of the content item for each user category without counting an identifier multiple times (e.g., if the identifier was assigned to multiple user categories).

For situations in which the systems described here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

Figure 1:
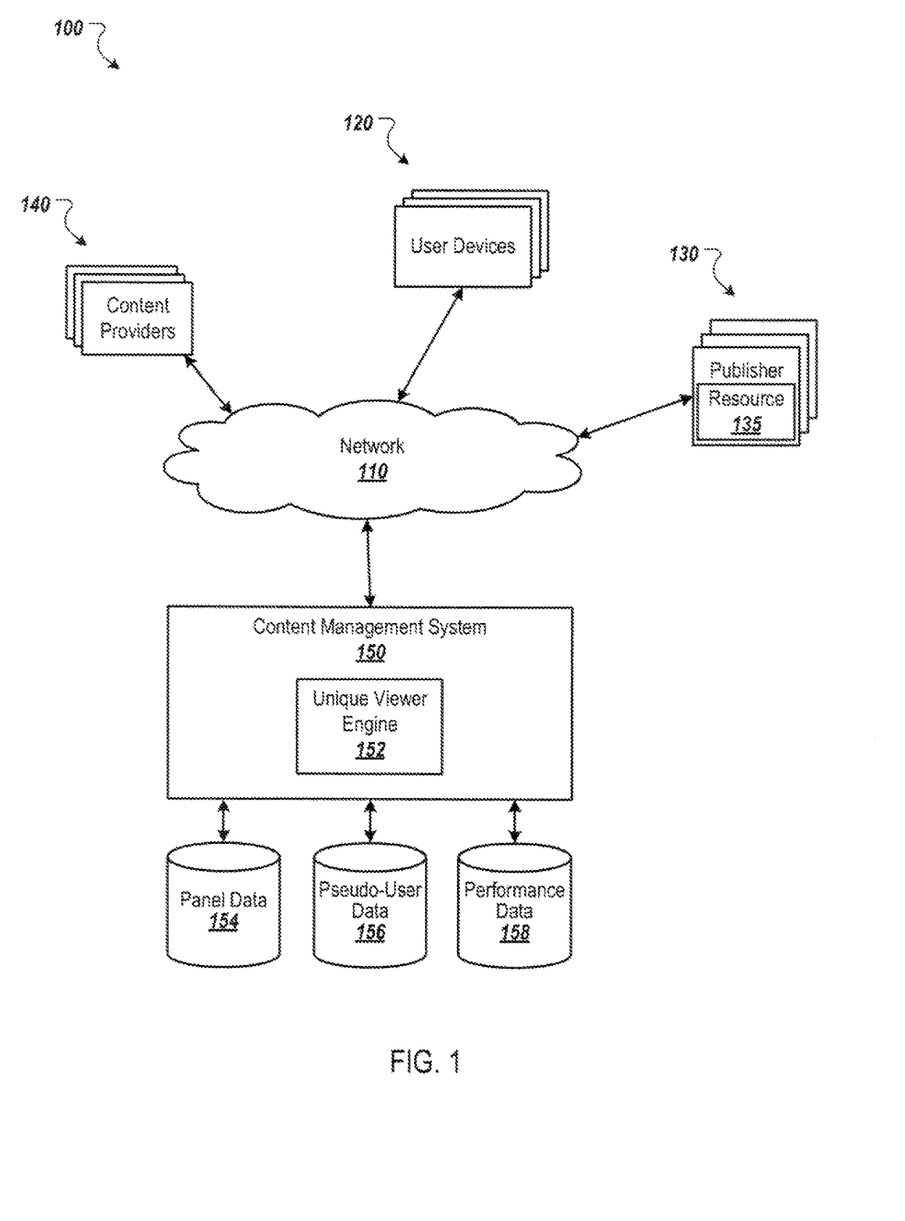
FIG. 1 is an example environment in which a content management system distributes content items.

FIG. 1 is an example environment 100 in which a content management system 150 distributes content items. The example environment 100 includes a network 110 such as a local area network (LAN), wide area network (WAN), the Internet, or a combination thereof. The network 110 connects user devices 120, publishers 130, content providers 140, and the content management system 150. The example environment 100 may include many user devices 120, publishers 130, and content providers 140.

A user device 120 is an electronic device that is capable of requesting and receiving resources over the network 110. Example user devices 120 include personal computers, mobile communication devices (e.g., smartphones, tablet computing devices, and/or smart watches), and other devices that can send and receive data over the network 110. A user device 120 typically includes a user application, such as a web browser, to facilitate the sending and receiving of data over the network 110. The web browser can enable a user to display and interact with text, images, videos, music, and other information typically located on a web page at a website. The user devices 120 can also include applications (also referred to as apps) that can enable a user to display and interact with similar content.

Publishers 130 can be network content providers that publish websites and/or applications (e.g., mobile apps). A website includes one or more resources 135 associated with a domain name and hosted by one or more servers. An example website is a collection of web pages formatted in hypertext markup language (HTML) that can contain text, images, multimedia content, and programming elements, such as scripts.

A resource 135 is any data that can be provided by the publisher 130 over the network 110. Resources include HTML pages, word processing documents, and portable document format (PDF) documents, images, video, maps, and feed sources, to name just a few. The resources can include content, such as words, phrases, pictures, and so on, and may include embedded information (e.g., meta information and hyperlinks) and/or embedded instructions (e.g., scripts). The publishers 130 can receive requests for content from the user devices 120 and provide content (e.g., a resource 135) for presentation in response to the requests.

When a resource 135 is requested by a user device 120, the content management system 150 may receive a request for one or more content items to be provided with the resource 135. The request for content items can include characteristics of one or more slots or impressions that are defined for the requested resource 135. For example, a reference (e.g., URL) to the resource 135, a size of the slot, and/or media types that are available for presentation in the slot can be provided to the content management system 150. Similarly, keywords associated with a requested resource ("resource keywords") can also be provided to the content management system 150 to facilitate identification of content that is relevant to the resource 135. A request for a resource 135 can also include an identifier, such as a cookie, identifying the requesting user device 120 (e.g., in instances in which the user consents in advance to the use of such an identifier).

Based, for example, on data included in the request for content, the content management system 150 can select content items that are eligible to be provided in response to the request, such as content items having characteristics matching the characteristics of a given slot. As another example, content items having selection keywords that match the resource keywords may be selected as eligible content items by the content management system 150. One or more selected content items can be provided to the user device 120 in association with providing an associated resource 135. In some implementations, the content management system 150 can select content items based at least in part on results of an auction. For example, for the eligible content items, the content management system 150 can receive bids from content providers 140 and allocate the slots, based at least in part on the received bids (e.g., based on the highest bidders at the conclusion of the auction).

The content management system 150 includes a unique viewer engine 152 that determines a number of unique viewers to which content items and/or resources 135 have been provided. For the purposes of this document, a resource 135 is considered a content item for which a number of unique viewers can be determined or estimated. The unique viewer engine 152 may determine an estimated number of unique viewers of a content item based on a number of identifiers that specify that the content item was viewed. An identifier is a data item (e.g., a cookie) associated with a user device 120 and that uniquely identifies the user device 120. A user device 120 may provide an identifier in response to presentation of a content item. For example, the user device 120 may provide the identifier with a request for content items or after a content item has been presented at the user device 120. In another example, the publisher 130 may receive data from an identifier (e.g., an identifier placed on the user device 120 by its website) when the user device requests the resource 135 from the publisher's website. In this example, the publisher 130 may provide the identifier (or certain data included in the identifier) to the content management system 150.

An identifier for a user device 120 may include data that specifies one or more content items that have been presented at the user device 120 and/or characteristics (e.g., inferred interests and/or demographic information) of a user associated with the user device 120. The content management system 150 may provide controls that allow the user to select which, if any, information is included in an identifier of the user's device(s).

The content management system 150 can determine the estimated number of unique viewers of a content item based on one or more distributions of identifiers per unique viewer. In one example, the estimated number of unique viewers is determined using a single distribution for an entire population (e.g., the online population of the U.S.). In another example, a distribution is determined for each user category in a set of user categories. Each user category can be defined based on characteristics of the users (e.g., inferred interests and/or demographic characteristics). For example, there may be a user category for users that are interested in fishing and another user category for users interested in football.

In some implementations, the distribution of identifiers per unique viewer for a user category (or for an entire population) can be approximated using Relationship (1) below.

$$y = \frac{kxP}{kx + P} \qquad \text{Relationship (1)}$$

In Relationship (1), "y" is the number of unique viewers; "x" is the number of identifiers; "P" is the actual population of users in a user category; and "k" is a parameter specific to the user category.

The parameter "k" for each distribution (and thus the distribution itself) can be determined using actual (e.g., historical) data regarding identifiers and unique viewers. In some implementations, the parameter "k" is determined using panel data 154 for a virtual panel. The virtual panel can include actual users that use one or more application programs that provide page link analysis browser request data, which can be used to infer characteristics of users based on users' web browsing history data while preserving the privacy of individual users and their browsing history. The page link analysis browser request data can include the web page browsing history of a user, e.g., identity of content items viewed and other data related to the user and resources viewed by the user. The virtual panel data can then be used to determine the number of unique viewers of a content item and the number of identifiers that correspond to the unique viewers. The virtual panel can include a large number (e.g., thousands or millions) of users, allowing the unique viewer engine 152 to determine an appropriate value for the parameter "k." Other appropriate methods of gathering web usage data can also be used to determine the number of unique viewers of a content item and the number of identifiers that correspond to the unique viewers.

The unique viewer engine 152 can determine the estimated number of unique viewers of a content item based on one or more distributions and a number of identifiers received by the content management system 150 that specify the a presentation of the content item. In some implementations, the unique viewer engine 152 creates pseudo-users for each user category based on a number of actual people that have characteristics that meet user criteria of the user category. For example, if there is a user category for users interested in scuba diving and there are 25,000 actual users that are interested in scuba diving, the unique viewer engine 152 may create 25,000 pseudo-users for a user category corresponding to users that are interested in scuba diving.

When an identifier is received by the content management system 150, the unique viewer engine 152 can identify a user category that corresponds to the identifier. Continuing the previous example, if an identifier is received for a user that is interested in scuba diving, the user category for scuba diving may be identified for the identifier. The unique viewer engine 152 may then assign the identifier to a pseudo-user in the identified user category based on the distribution determined for the user category. For example, the unique viewer engine 152 may assign the identifier to a pseudo-user such that the distribution of identifiers per unique viewer in the identified user category matches or approximates the distribution for the user category.

In some implementations, the unique viewer engine 152 assigns the received identifier to a pseudo-user within the identified user category based on probabilities associated with each pseudo-user in the user category. For example, the probabilities for each pseudo-user may be selected such that the identifiers are distributed to pseudo-users in a manner that matches the distribution for the user category.

In some implementations, the unique viewer engine 152 assigns the received identifier to a pseudo-user within the identified user category based on a product log function (also called a Lambert W function or omega function). Other appropriate functions may also be used. For example, if the parameter "k" for a user category has a value of one or close to one, identifiers that correspond to the user category can be assigned to pseudo-users using Relationship (2) below.

$$PseudoUser = \text{population} * -\frac{t}{W\left(-\frac{t}{e},-1\right)} \qquad \text{Relationship (2)}$$

In Relationship (2), "Pseudo-User" is a unique identifier for a pseudo-user in the user category; population is the total actual population for the user category (e.g., 50,000 if there are 50,000 actual people that match the user criteria for the user category); "t" is a number (e.g., selected randomly or pseudo-randomly for the identifier); and $$W\left(-\frac{t}{e},-1\right)$$

is the first branch of the product log function. In this example, each pseudo-user has a unique identifier based on the number of actual people in the user category. For example, if the user category includes 50,000 people, the unique identifiers for the pseudo-users in the user category would be in the range of 1-50,000 and each pseudo-user would be assigned one of the integers in that range.

The value of the parameter "t" can be selected randomly for each identifier, e.g., when (or after) the identifier is received. The value of "t" can be within a normalized range of the population range for the user category. For example, the population range can be normalized to a range from 0-1 and the value of "t" can be selected from this range for a received identifier. The selected value for "t" can then be used in Relationship (2) to determine which pseudo-user to assign the identifier. Data specifying a mapping between received identifiers and their assigned pseudo-users can be stored in a pseudo-user data 156.

The mapping between identifiers and pseudo-users can be used to determine an estimated number of unique viewers that have viewed content items. For example, to determine the number of unique users that have viewed a given content item, the unique viewer engine 152 can determine the number of pseudo-users that have been assigned an identifier that specifies an impression of that content item. The unique viewer engine 152 can maintain, e.g., in performance data 158, a running total of the estimated number of unique viewers of each content item and update the running totals based on newly received identifiers.

The unique viewer engine 152 can also determine other performance data based on the assignment of received identifiers to pseudo-users. For example, the unique viewer engine 152 may determine an estimated number of unique viewers in each user category that viewed a content item based on the number of pseudo-users in the user category that has been assigned an identifier that specified a view of the content item. Other performance data, such as estimated reach, estimated GRP, and estimated frequency can also be determined based on the assignments of received identifiers to pseudo-users.

Figure 2:
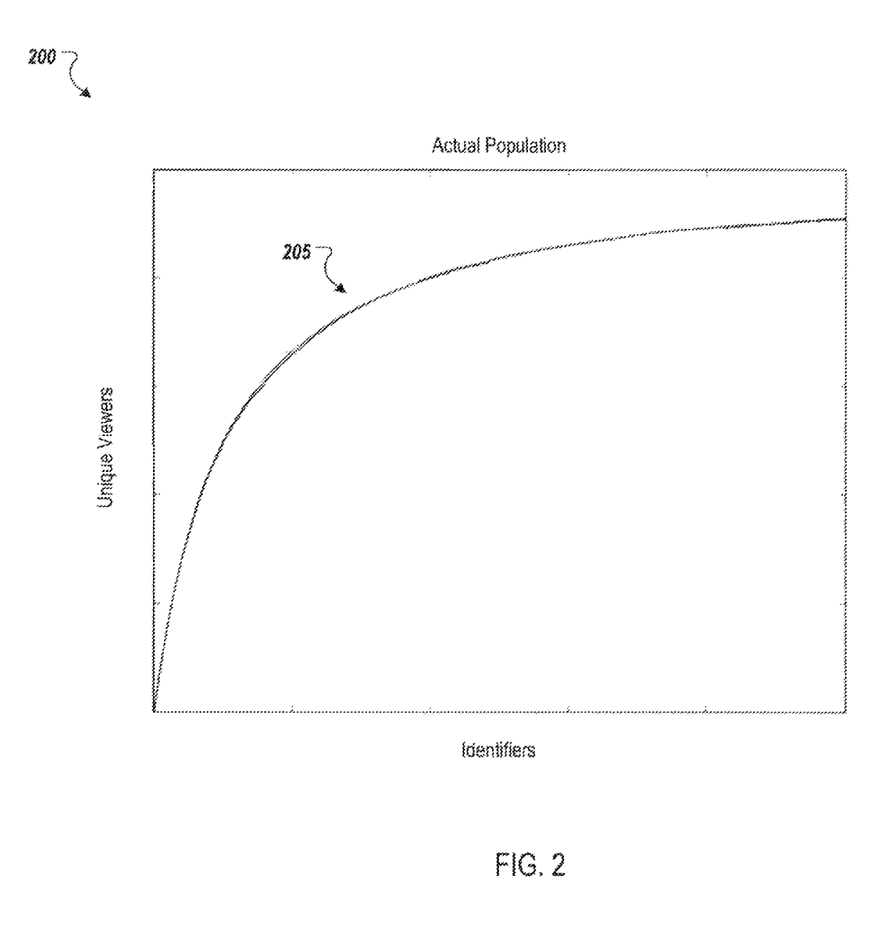
FIG. 2 is a graph of an example distribution of identifiers per unique viewer.

FIG. 2 is a graph 200 of an example distribution 205 of identifiers per unique viewer. The example distribution 205 may be for a total population (e.g., in a particular location) or for the population of a particular user category. In this example, the number of unique viewers increases non-linearly with an increase in identifiers, but the number of unique viewers does not reach the amount of the total population of actual users (represented by the top of the graph 200). That is, in this example, an identifier has not been received for every member of the population.

Figure 3:
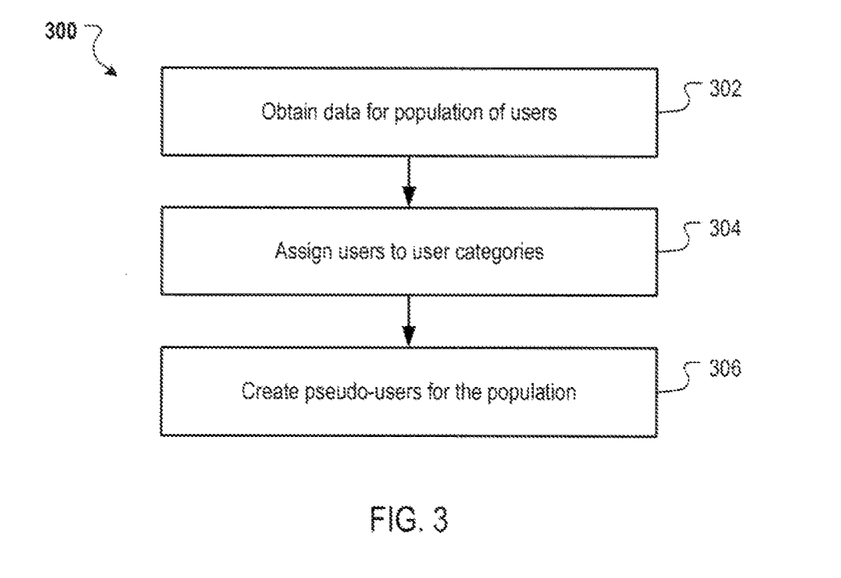
FIG. 3 is a flow chart of an example process for creating pseudo-users for a user category.

FIG. 3 is a flow chart of an example process 300 for creating pseudo-users for a user category. Operations of the process 300 can be implemented, for example, by a data processing apparatus, such as the content management system 150 of FIG. 1. The process 300 can also be implemented by instructions stored on computer storage medium, where execution of the instructions by a data processing apparatus cause the data processing apparatus to perform the operations of the process 300.

Data is obtained for a population of users (302). The obtained data can include data that specifies a total population for a particular area. For example, this data may include census data that specifies the total number of people that live in particular areas. This data may also specify characteristics of users, such as inferred interests or demographic data.

The users in the population are assigned to user categories (304). For example, a number of user categories may be defined for a content item campaign or for multiple content item campaigns. Each user category can be associated with respective user criteria. For example, the user criteria for a particular user category may specify a particular interest, e.g., traveling. Each user can be assigned to a user category based on the user's characteristics and the user criteria of the user categories.

Pseudo-users are created for the population of users (306). A pseudo-user is a non-real user that represents a user of the population. For example, the number of pseudo-users may be equal to the number of actual users in the population. Pseudo-users may be created for each user category based on the number of actual users in each user category. For example, if there are 10,000 users in the population that match the user criteria for a user category, 10,000 users may be created for the user category. As the pseudo-users are not real users, the pseudo-users may not, in some implementations, be associated with actual user data. Instead, each pseudo-user may be associated with its corresponding user category, a unique identifier that identifies the pseudo-user, and any identifiers assigned to the pseudo-user, as described in more detail below.

Figure 4:
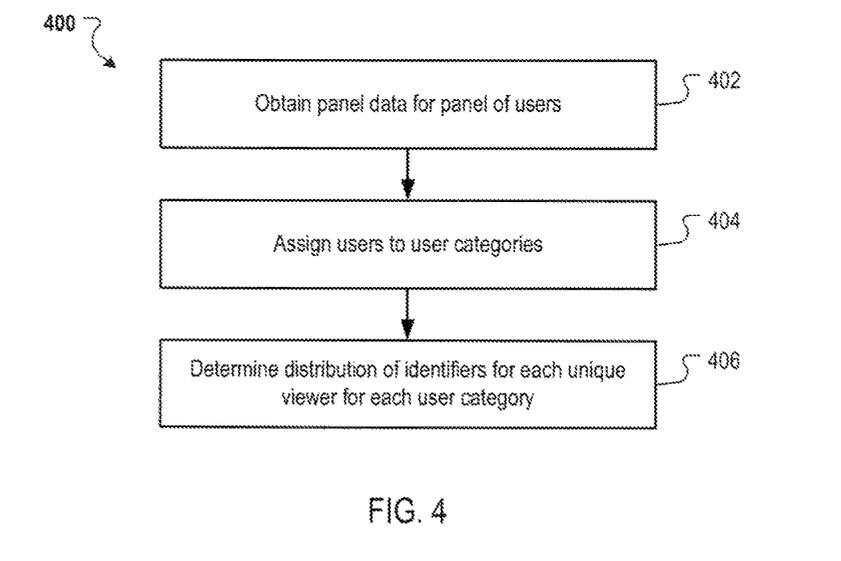
FIG. 4 is a flow chart of an example process for determining a distribution of identifiers per unique viewer for a user category.

FIG. 4 is a flow chart of an example process 400 for determining a distribution of identifiers per unique viewer for a user category. Operations of the process 400 can be implemented, for example, by a data processing apparatus, such as the content management system 150 of FIG. 1. The process 400 can also be implemented by instructions stored on computer storage medium, where execution of the instructions by a data processing apparatus cause the data processing apparatus to perform the operations of the process 400.

Panel data is obtained for a panel of users (402). As described above, the virtual panel can include actual users that allow page link analysis browser request data to be provided to a content management system. The panel data can include the page link analysis browser request data, which includes the web page browsing history of the panel users. The web page browsing history for a panel user can include the identity of content items viewed by panel user and other data related to the panel user and resources viewed by the panel user.

The panel users are assigned to user categories (404). For example, the panel users may be assigned to the same set of user categories as the population of users in the process 300 of FIG. 3. Each panel user may be assigned to a particular user category based on the characteristics (e.g., inferred interests) of the panel user (or actual provided characteristics of the panel user) and the user criteria of the particular user category.

A distribution of identifiers per unique viewer is determined for each user category using the panel data (406). The distribution for a user category can be determined by identifying the number of identifiers received for each panel user assigned to the user category. Based on the number of identifiers for each panel user, a distribution can be approximated, for example, using Relationship (1) above. For example, the parameter "k" can be approximated such that a distribution curve resulting from Relationship (1) and the value of parameter "k" fits the panel data for the user category.

Figure 5:
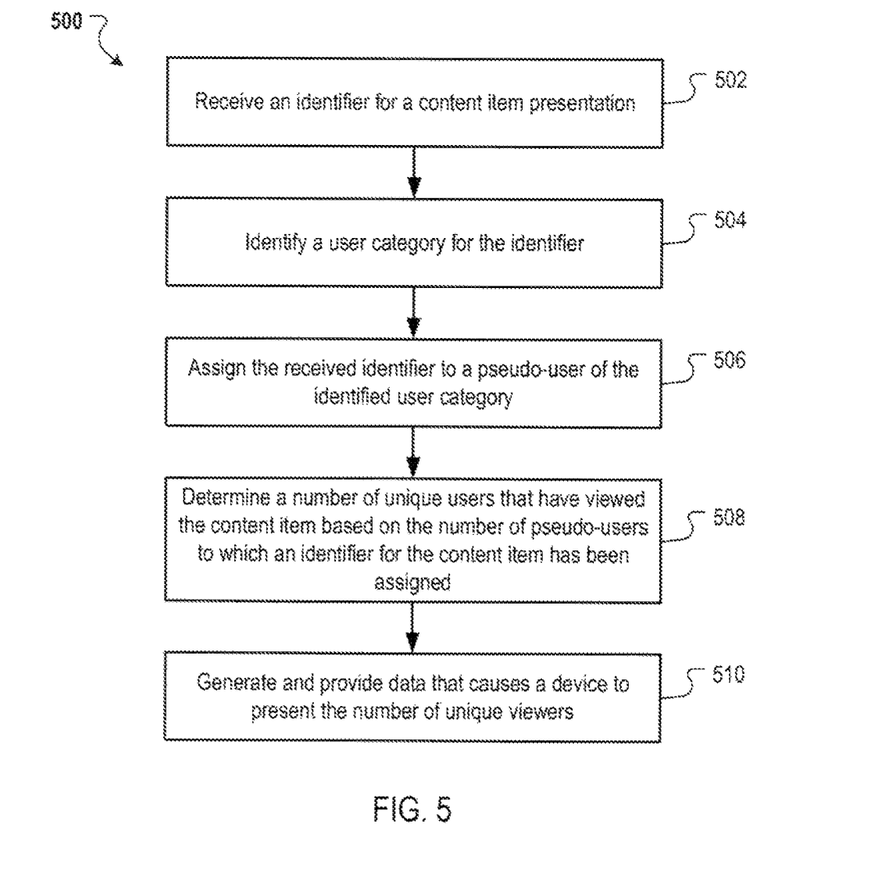
FIG. 5 is a flow chart of an example process for determining a number of unique viewers of a content item and providing data specifying the number of unique viewers.

FIG. 5 is a flow chart of an example process 500 for determining a number of unique viewers of a content item and providing data specifying the number of unique viewers. Operations of the process 500 can be implemented, for example, by a data processing apparatus, such as the content management system 150 of FIG. 1. The process 500 can also be implemented by instructions stored on computer storage medium, where execution of the instructions by a data processing apparatus cause the data processing apparatus to perform the operations of the process 500.

An identifier is received for a content item presentation (502). For example, a user device may send the identifier with a content request and/or in response to presentation of a content item. The identifier may include characteristics of a user (e.g., inferred interests or demographic data) of the user device and information identifying one or more content items presented at the user device, for each, in a particular time period.

A user category is identified for the received identifier (504). The user category for the received identifier may be identified by comparing characteristics of the user (e.g., from the received identifier) to user criteria of each user category. The received identifier may be assigned to the user category for which the user data of the received identifier matches or best matches.

The received identifier is assigned to a pseudo-user of the identified user category (506). Received identifiers may be assigned to pseudo-users of the user categories in a manner such that the distribution of identifiers assigned to the user category per pseudo-user matches or approximately matches the distribution of identifiers per unique viewer of the user category.

In some implementations, each pseudo-user of the user category is assigned a probability such that the distribution of identifiers per pseudo-user follows the distribution of identifiers per unique viewer of the user category. The probabilities of the pseudo-users may differ to simulate the different numbers of identifiers per unique viewer of the user category. For example, one actual user in the user category may have multiple identifiers, each corresponding to a particular user device while another actual user may have only one identifier. Similarly, a first pseudo-user may have a higher probability than a second pseudo-user such that the first pseudo-user is more likely to be assigned multiple received identifiers over time than the second pseudo-user.

In a probability implementation, the received identifier may be randomly assigned to a pseudo-user in the user category based on the probabilities. If a same identifier is received multiple times, the identifier may remain assigned to the same pseudo-user.

In some implementations, the received identifier is assigned to a pseudo-user in the user category using a function that is based on a product log function, such as Relationship (2) above. In this example, the number of pseudo-users in the user category may be normalized to a range between zero and one. For example, if there are 15,000 pseudo-users in the user category, the numerical range of 0-10 may be normalized to 0-1. The received identifier may then be assigned to a number in the normalized range of 0-1. Continuing the previous example, as there are 10 pseudo-users represented by the normalized range of 0-1, a number from the set [0.1, 0.2, 0.3, 0.4, 0.5, 0.6, 0.7, 0.8, 0.9, and 1.0] may be selected for the received identifier. If there were only two pseudo-users in the user category, the number for the received identifier may be selected from the set of [0.5, 1.0]. This selected number represents the "t" parameter of Relationship (2). The number for the identifier used as the "t" parameter may be selected randomly (e.g., based on a uniform distribution) or pseudo-randomly.

The value of the "t" parameter is then used in the function of Relationship (2) to determine a pseudo-user identifier. Using Relationship (2), the pseudo-user identifier is determined based on a function of a first number (the value of parameter "t"), a product logarithmic function that uses the first number, and a number of actual users in the identified user category. The received identifier may be assigned to the pseudo-user uniquely identified by the determined pseudo-user identifier.

An estimated number of unique viewers that have viewed the content item is determined (508). The estimated number of unique viewers of the content item can be determined by identifying each pseudo-user that has been assigned a received identifier that specifies a view of the content item. For example, if 1,000 identifiers have been received that specify a particular content item and those 1,000 identifiers have been assigned to 9,500 different pseudo-users, the estimated number of unique viewers of the content item is 9,500. The estimated number of unique viewers of the content item can also be determined for each user category by counting the number of pseudo-users in the user category that has been assigned an identifier that specifies the content item.

Data is generated and provided to a device (510). The data may include instructions that cause the device to present the estimated number of unique viewers of the content item at the device. For example, the device may execute the instructions and the instructions, upon execution, may cause the device to present the estimated number of viewers of the content item. In some implementations, a report may be provided that described the estimated number of viewers of the content item across a population of users and/or for one or more user categories.

The example process 500 can be performed online and/or in real time in response to receiving an identifier, for example, without re-evaluating the distributions of identifiers and unique viewers. In addition, a running count can be maintained for each content item and the count(s) can be updated based on the assignment of newly received identifiers to pseudo-users.

The estimated number of unique viewers of a content item can be used for many purposes. For example, the content management system 150 of FIG. 1 can automatically generate reports that specify the number of unique viewers of content items provided by a content provider and transmit the reports to the content provider. The content management system 150 may generate the reports periodically, e.g., daily, weekly, or hourly, so that the content providers can monitor the performance of their content items. The reports may include the total number of unique viewers of a content item and/or the number of unique viewers for each user category. The reports may include data, e.g., code, that causes a server of the content provider to present the report.

The number of unique viewers of a content item can be used to determine how much a content provider should pay for presentations of its content items. For example, a content provider may agree to pay a certain amount for each unique viewer that views a content item. The number of unique viewers and the amount that the content provider agrees to pay for each unique viewer of the content item can be used to determine a total amount that the content provider should pay.

The number of unique viewers of a content item can be used for forecasting purposes. For example, the number of unique viewers of a content item during a given period of time can be used to forecast the number of unique viewers that will view the content item during future time periods. The content management system 150 can include this forecasted number in reports generated and transmitted to the content provider.

The number of unique viewers of a content item during a given time period can be used to pace the number of presentations of the content item. For example, a content provider may want to have its content item presented to a total of 100 unique viewers over a 10 day period. In this example, the content provider may want to have its content item presented to about 10 unique viewers each day of the 10 day period. If the unique viewer engine 152 of the content management system 150 determines that more than 10 unique viewers viewed the content item on the first of the 10 days, the content provider (or a server of the content provider) or the content management system 150 (if permitted to by the content provider) may automatically adjust campaign criteria (e.g., bid amounts, keywords for which the content item is distributed, user categories, budgets, etc.) for the content item. In this example, the bid for the content item may be reduced and/or the number of keywords for which the content item is distributed may be reduced to reduce the number of unique viewers that will view the content item over the next 9 days.

The number of unique viewers of a content item can be used to automatically adjust campaign criteria for the content item and/or to recommend adjustments to the content provider that provides the content item. For example, the content management system 150 can automatically adjust campaign criteria (e.g., bid amounts, keywords, user categories, and/or budget) to increase the reach of the content item overall or in particular user categories. In another example, the content management system 150 can generate a recommendation that specifies adjustments to the campaign criteria for a content item and transmit the recommendation for presentation to the content provider that provides the content item.

The techniques described above for determining the number of unique viewers of a content item can also be used to determine the number of unique viewers of other items, such as electronic resources (e.g., web pages). For example, the content management system 150 (or the publisher itself) may determine the number of unique viewers of a web page and provide a report to the publisher of the web page that specifies the number of unique viewers (overall number and/or category specific number).

Figure 6:
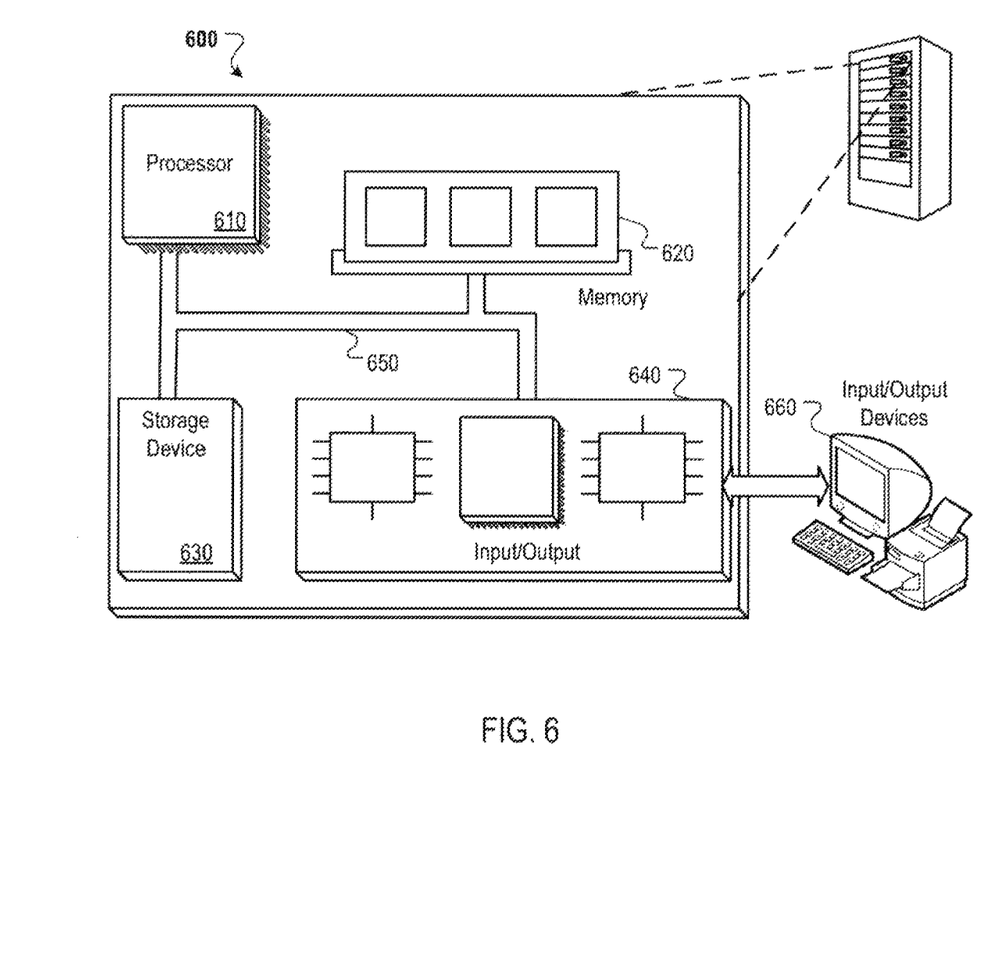
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface device, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving an identifier specifying characteristics of a user associated with a device that was used to present a given content item;
   identifying, from a set of user categories, a user category for the received identifier based on the characteristics, each user category of the set of user categories including a respective number of pseudo-users;
   assigning the received identifier to a given pseudo-user in the identified user category based on a non-linear distribution of identifiers per actual user in the identified user category;
   determining a number of unique users, including the given pseudo-user, that have viewed the given content item based on a total number of pseudo-users that have been assigned an identifier corresponding to presentation of the given content item; and
   generating and providing data that causes a device to present the number of unique viewers.

2. The method of claim 1, wherein assigning the received identifier to the given pseudo-user comprises:
   selecting a first number from a range of numbers;
   determining a pseudo-user identifier based on a function of the first number, a product logarithmic function that uses the first number, and a number of actual users in the identified user category; and
   selecting the given pseudo-user based on the pseudo-user identifier.

3. The method of claim 2, wherein the first number is selected randomly from a uniform distribution of numbers in the range of numbers.

4. The method of claim 1, wherein assigning the received identifier to the given pseudo-user comprises assigning the received identifier to the given pseudo-user based on a respective probability for each pseudo-user of the identified user category, the probability of each pseudo-user being determined based on the distribution of identifiers for actual users in the identifier user category.

5. The method of claim 4, wherein the probability for a first pseudo-user of the identified user category is different from the probability for a second pseudo-user of the identified user category.

6. The method of claim 1, wherein each user category includes a number of pseudo-users based on a number of actual users in a population of users that match user criteria for the user category.

7. The method of claim 1, wherein the received identifier comprises a cookie.

8. A system, comprising:
   a data processing apparatus; and
   a memory apparatus in data communication with the data processing apparatus and storing instructions executable by the data processing apparatus and that upon such execution cause the data processing apparatus to perform operations comprising:
      receiving an identifier specifying characteristics of a user associated with a device that was used to present a given content item;
      identifying, from a set of user categories, a user category for the received identifier based on the characteristics, each user category of the set of user categories including a respective number of pseudo-users;
      assigning the received identifier to a given pseudo-user in the identified user category based on a non-linear distribution of identifiers per actual user in the identified user category;
      determining a number of unique users, including the given pseudo-user, that have viewed the given content item based on a total number of pseudo-users that have been assigned an identifier corresponding to presentation of the given content item; and
      generating and providing data that causes a device to present the number of unique viewers.

9. The system of claim 8, wherein assigning the received identifier to the given pseudo-user comprises:
   selecting a first number from a range of numbers;
   determining a pseudo-user identifier based on a function of the first number, a product logarithmic function that uses the first number, and a number of actual users in the identified user category; and
   selecting the given pseudo-user based on the pseudo-user identifier.

10. The system of claim 9, wherein the first number is selected randomly from a uniform distribution of numbers in the range of numbers.

11. The system of claim 8, wherein assigning the received identifier to the given pseudo-user comprises assigning the received identifier to the given pseudo-user based on a respective probability for each pseudo-user of the identified user category, the probability of each pseudo-user being determined based on the distribution of identifiers for actual users in the identifier user category.

12. The system of claim 11, wherein the probability for a first pseudo-user of the identified user category is different from the probability for a second pseudo-user of the identified user category.

13. The system of claim 8, wherein each user category includes a number of pseudo-users based on a number of actual users in a population of users that match user criteria for the user category.

14. The system of claim 8, wherein the received identifier comprises a cookie.

15. A non-transitory computer-readable storage medium having machine instructions stored therein that when executed by one or more processors cause the one or more processors to perform operations comprising:
   receiving an identifier specifying characteristics of a user associated with a device that was used to present a given content item;
   identifying, from a set of user categories, a user category for the received identifier based on the characteristics, each user category of the set of user categories including a respective number of pseudo-users;
   assigning the received identifier to a given pseudo-user in the identified user category based on a non-linear distribution of identifiers per actual user in the identified user category;
   determining a number of unique users, including the given pseudo-user, that have viewed the given content item based on a total number of pseudo-users that have been assigned an identifier corresponding to presentation of the given content item; and
   generating and providing data that causes a device to present the number of unique viewers.

16. The non-transitory computer-readable storage medium of claim 15, wherein assigning the received identifier to the given pseudo-user comprises:
   selecting a first number from a range of numbers;
   determining a pseudo-user identifier based on a function of the first number, a product logarithmic function that uses the first number, and a number of actual users in the identified user category; and
   selecting the given pseudo-user based on the pseudo-user identifier.

17. The non-transitory computer-readable storage medium of claim 16, wherein the first number is selected randomly from a uniform distribution of numbers in the range of numbers.

18. The non-transitory computer-readable storage medium of claim 15, wherein assigning the received identifier to the given pseudo-user comprises assigning the received identifier to the given pseudo-user based on a respective probability for each pseudo-user of the identified user category, the probability of each pseudo-user being determined based on the distribution of identifiers for actual users in the identifier user category.

19. The non-transitory computer-readable storage medium of claim 18, wherein the probability for a first pseudo-user of the identified user category is different from the probability for a second pseudo-user of the identified user category.

20. The non-transitory computer-readable storage medium of claim 15, wherein each user category includes a number of pseudo-users based on a number of actual users in a population of users that match user criteria for the user category.

* * * * *